United States Patent [19]
Hansen et al.

[11] Patent Number: 6,081,606
[45] Date of Patent: Jun. 27, 2000

[54] APPARATUS AND A METHOD FOR DETECTING MOTION WITHIN AN IMAGE SEQUENCE

[75] Inventors: Michael Wade Hansen, New Hope, Pa.; Peter Jeffrey Burt, Princeton Township, Mercer County, N.J.

[73] Assignee: Sarnoff Corporation, Princeton, N.J.

[21] Appl. No.: 08/664,584

[22] Filed: Jun. 17, 1996

[51] Int. Cl.[7] ....................................................... G06K 9/00
[52] U.S. Cl. ........................... 382/107; 382/260; 348/699
[58] Field of Search ................................... 382/107, 278, 382/240, 260; 348/699

[56] References Cited

U.S. PATENT DOCUMENTS

| | | | |
|---|---|---|---|
| 5,067,014 | 11/1991 | Bergen et al. | 382/107 |
| 5,265,172 | 11/1993 | Markandey et al. | 382/107 |
| 5,325,449 | 6/1994 | Burt et al. | 382/56 |
| 5,469,850 | 11/1995 | Iizuka et al. | 128/660.07 |
| 5,515,448 | 5/1996 | Nishitani | 382/107 |
| 5,530,771 | 6/1996 | Maekawa | 382/103 |

OTHER PUBLICATIONS

Burt, P., et al., "Electronically Directed "Focal" Stereo", IEEE, Aug. 1915, pp. 94–101.
Bergen, J.R., et al., "Object Tracking with a Moving Camera", IEEE, 1989, pp. 2–12.
Bergen, J., et al., "Computing Two Motions From Three Frames", IEEE, 1990, pp. 27–32.
Bergen, J. et al., "A Three–Frame Algorithm for Estimating Two–Component Image Motion", IEEE, 1992, pp. 886–896.
Smith, S.M., "Asset-2: Real–Time Motion Segmentation and Shape Tracking", IEEE, 1995, pp. 237–244.
Shah, M., et al., "Motion Trajectories", IEEE, 1993, pp. 1138–1150.
Wang, J. Y. A., et al., "Layered Representation for Motion Analysis", IEEE, 1993, pp. 361–366.
Shah, M., et al., "Generation and Segmentation of Motion Trajectories", IEEE, 1992, pp. 74–77.
Hansen, et al., "Real–Time Scene Stabilization and Mosaic Construction", Proceedings of the Second IEEE Workshop on Applications of Computer Vision, Sarasota, Florida, Dec. 5–7, 1994, pp. 54–62.

*Primary Examiner*—Matthew Bella
*Attorney, Agent, or Firm*—William J. Burke

[57] ABSTRACT

Apparatus and a concomitant method of identifying the direction of motion within a scene that is represented by a sequence of images, e.g., a series of frames in a video sequence. The apparatus contains a flow field generator, a flow field segmentor, and alarm detector and an alarm processor. The flow field generator processes the sequence of images and generates a substantially distortionless flow field representing the motion within a scene. The flow field is a vector representation of the motion of the scene that represents both the magnitude and the direction of the motion. The flow field is generated by correlating at least two frames in the sequence of images. This flow field is analyzed by a flow field segmentor to determine the magnitude and direction of motion with the scene and segment the motion information from the static portions of the scene. An alarm detector then processes the motion information to determine if an alarm should be generated based upon the motion information. The alarm processor activates an appropriate alarm response, e.g., illuminate warning lamps, sound a warning alarm, lock doors, and alert security personnel.

17 Claims, 3 Drawing Sheets

APPARATUS AND A METHOD FOR DETECTING MOTION WITHIN AN IMAGE SEQUENCE

The invention relates to image processing systems, and more particularly, to apparatus and a concomitant method of detecting motion within an image sequence.

BACKGROUND OF THE DISCLOSURE

Motion detection is used in various forms of surveillance and monitoring systems. These systems may detect motion using rudimentary sensors such as ultra-sound and infrared sensors, where any change in the background audio or infrared signal is interpreted as motion. Signal processing in these systems can be as simple as a threshold level that, when exceeded, indicates motion within the sensor's range.

On the other hand, surveillance and monitoring systems may rely upon complex video image processing to analyze a series of images captured by a video camera. Processing of the images requires frame-to-frame comparison of the image content, usually accomplished by subtracting a given frame from a previous frame, resulting in a difference image representing changes between the two images. The absolute value or the square of the difference image results in an image that represents the magnitude of change at each position in the image. This magnitude information alone is useful in determining if motion has occurred within a scene, but is not indicative of the direction of the motion or computing motion "flow" between successive images.

Determination of the direction of the motion is generally accomplished by generating multiple images of magnitude information, e.g., a magnitude information image sequence, and determining the movement of the magnitude information within the image sequence. This can be accomplished by tracking areas in the image sequence having significant change or change that conforms to a specific criteria such a having a size, shape and speed of a person walking or running through the scene. To determine the specific motion direction, the system must independently track the physical position if any significant change that occurs from one image to the next. Independently tracking this movements can be a daunting process for any reasonably priced computer system. Consequently, these systems are prone to false alarms when faced with complex motion such a walking person or multiple moving objects within the scene.

To limit the potential number of areas that are to be independently tracked, and thus reduce the computational complexity required to track movement in the scene, the typical surveillance and monitoring system images a restricted scene. In the restricted scene, the position, size and direction of motion of most of the "normal" motion in the scene is proscribed by physical barriers. For example, in an airport surveillance system, physical barriers are used to channel all persons through a single area in the scene. As such, all "normal" motion is through the channel and in a single direction. Abnormal motion is defined as motion within the scene, that is outside the channel. Such motion would occur if a person were to "jump" the barrier. The use of image optical flow-based methods for determining motion in an unrestricted scene is not viable using traditional techniques because such methods are prone to error, especially in areas of complex motion. This problem keeps flow-based methods from being a viable alternative for motion discrimination without significant restriction of image motion. The use of change-based methods without flow are also noise-prone, especially when changes in illumination of the scene are present.

Such restrictive systems are useless in many security applications and can be overly restrictive to customers and passengers. Consequently, use of such systems has not been widespread.

Therefore, a need exists in the art for a method and apparatus that accurately detects motion within an image sequence and, more particularly, a method and apparatus that detects both the magnitude and the direction of the motion without the need for restricting the motion in the scene.

SUMMARY OF THE INVENTION

The disadvantages heretofore associated with prior art motion direction detection are overcome by the present invention. The invention is apparatus and a concomitant method of identifying the direction of object motion within a scene that is represented by a sequence of images, e.g., a series of frames in a video sequence. The invention processes the sequence of images and generates a substantially distortionless flow field representing the motion within a scene. The flow field is a vector representation of the motion of the scene that represents both the magnitude and the direction of the motion. The flow field is generated by sequentially correlating two or more frames in the sequence of images, using shaping pre-filters and specialized correlation analysis techniques to create a flow field with high fidelity and noise suppression.

The flow field of the present scene is analyzed by a flow field segmentor. The segmentor determines the magnitude and direction of motion with the scene and segments the motion information from the static portion of the image sequence. An alarm detector then processes the motion information to determine if an alarm should be generated based upon the motion information. Specifically, the alarm detector compares the motion information to an alarm criteria. If the motion information fits the criteria, an alarm flag is sent to the alarm processor. The alarm processor activates an appropriate alarm response, e.g., illuminate warning lamps, sound a warning alarm, lock doors, alert security personnel, and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
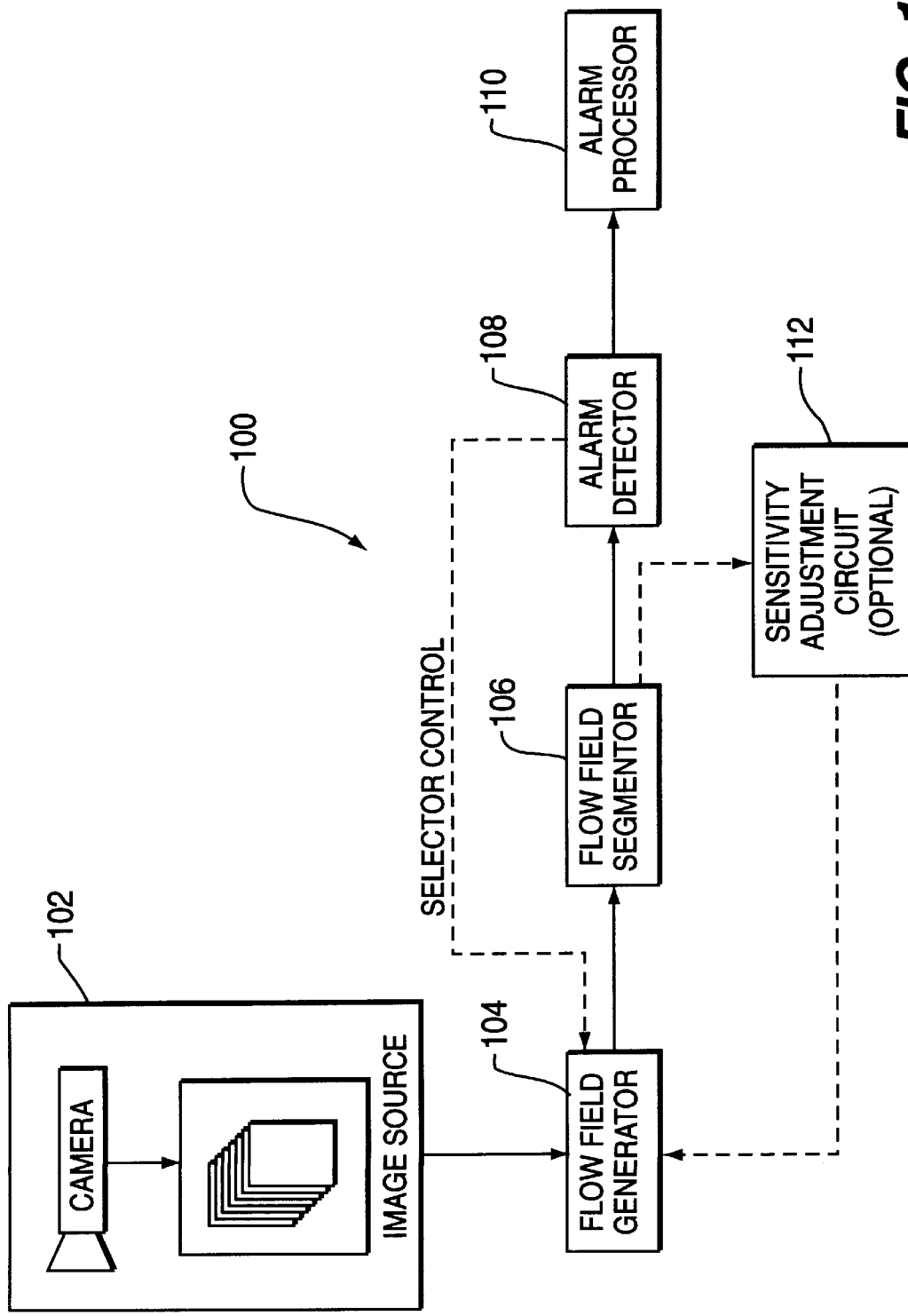
FIG. 1 depicts a block diagram of the motion detection apparatus of the present invention.

FIG. 1 depicts a block diagram of the motion detection apparatus 100 of the present invention. An image source 102 such as a video camera, infrared array, and the like, provides, to the apparatus 100, a sequence of images. Generally speaking, the image source can be any imaging sensor that provides two-dimensional, time sequenced data or the image source may recall such data from a storage device.

The apparatus 100 contains a flow field generator 104, a flow field segmentor 106, an alarm detector 108, and an alarm processor 110. The flow field generator processes at least two frames of the image sequence to generate a flow field representing the relative motion between the frames. As shall be discussed with respect to FIG. 2, the flow field generator preferably processes three frames from the sequence. The flow field segmentor 106 analyzes the flow field and determines the magnitude and direction of the motion occurring in the scene. The alarm detector 108 compares the motion magnitude and direction information to previously defined definitions of "allowed" and "barred" motion. If the alarm detector determines the detected motion to be allowed motion, nothing happens. On the other hand, if the motion is deemed "barred" motion, the alarm detector sends a signal to the alarm processor 110. The alarm processor initiates an appropriate security measure, e.g., illuminating a warning indicator, locking specific doors, notifying authorities, enhancing other security measures, and the like.

The motion detection apparatus 100 may contain an optional sensitivity adjustment circuit 112. This circuit is coupled to the segmentor 106. If the flow field segmentor does not generate a flow field over a predefined period of time, the sensitivity adjustment circuit reduces the motion sensitivity of the flow field generator 104. Conversely, if an excessive amount of flow field information is produced, circuit 112 decreases the sensitivity of the flow field generator 114. This provides the apparatus with a dynamic motion detection technique that can optimize the motion detection to the environment of the scene.

Figure 2:
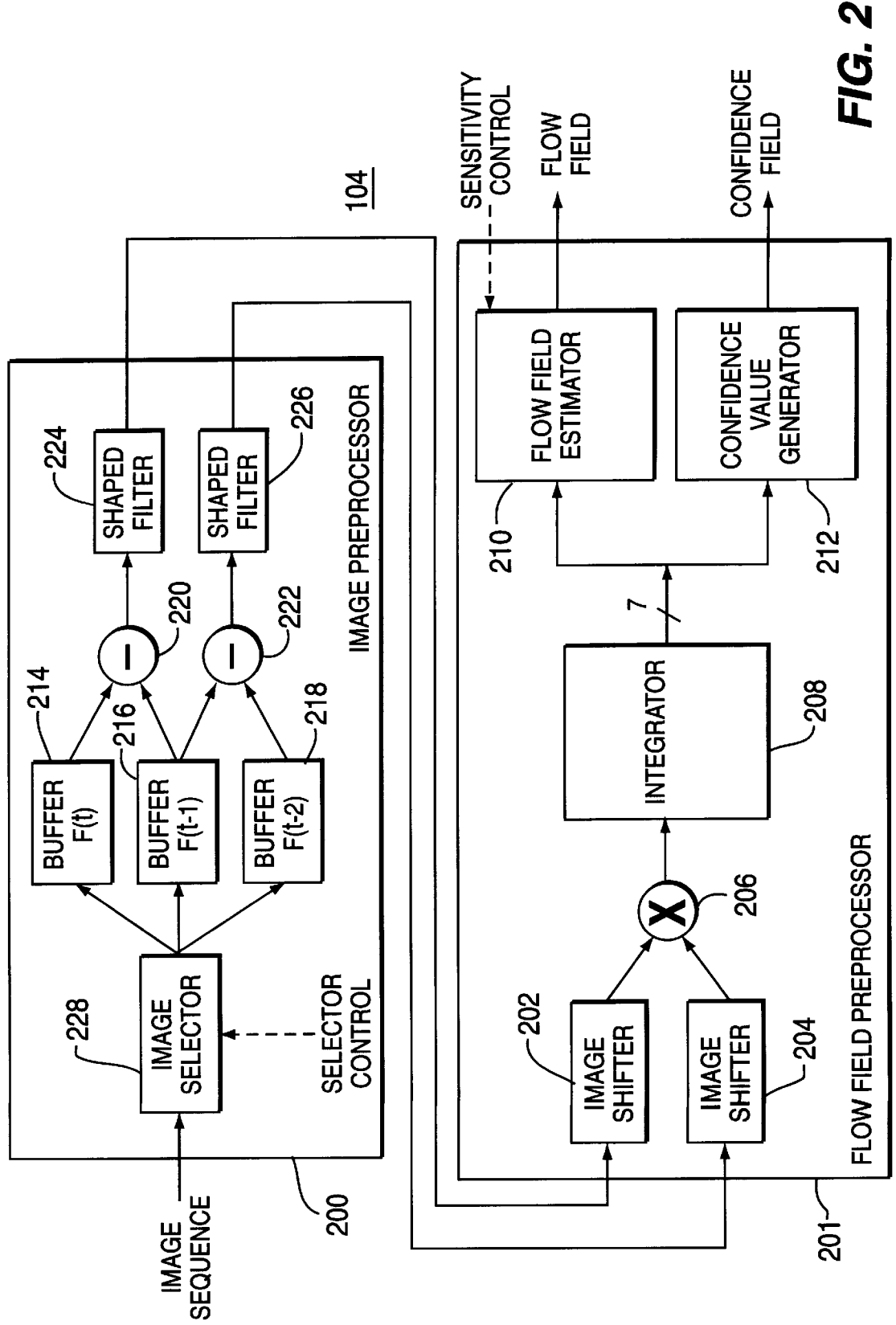
FIG. 2 depicts a block diagram of a flow field generator.

FIG. 2 depicts a block diagram of the flow field generator 104. The flow field generator 104 contains an image preprocessor 200 and a flow field processor 201. The preprocessor operates upon at least two images from the image sequence and generates information that is used by the flow field processor to produce the flow field vectors.

In the preferred embodiment of the invention, the preprocessor 200 simultaneously processes three images in the input image sequence. These images are selected from the image sequence by image selector 228. The three consecutive images are temporarily stored in image buffers 214, 216, and 218. Buffers 214 and 216 are connected to subtractor 220 and buffers 216 and 218 are connected to subtractor 222. Each subtractor subtracts, pixel-by-pixel, the contents of one image buffer from the other image buffer to produce a difference image. The subtractors 220 and 222 are respectively connected to shaped filters 224 and 226. Each difference image is then filtered by one of these shaped filters 224 and 226.

The subtraction process removes all stationary objects that appear in the consecutive images, e.g., all background objects are removed. Thus only moving objects will appear in the difference images. The shaped filters "tune" the image information to enhance the image characteristics that are used to determine the flow field. These filters are generally application dependent. For example, the filters may alter the image resolution using a pyramid representation of each difference image. Pyramid representations of images are commonly known as Gaussian pyramids and are well-known in the art of image processing. The resolution level selected from the pyramid is the best resolution for representing the moving objects in the scene that are of particular importance. For example, a high resolution pyramid level would contain motion information pertaining to distant or small objects such as mice, moths, and the like. An appropriate level can be selected that best represents people, automobiles, and the like. As such, the shaped filters remove unnecessary information from the images that will be processed to create the flow field.

These shaped filters are generated through first generating a Laplacian representation of the input images to eliminate variations in the imagery due to illumination changes. Subsequently, the Laplacians are oriented to be perpendicular to the direction of interest. The resolution is chosen to match the scale and velocity of the targets to be detected. Such shaped filters are disclosed in Burt, et al., "Object Tracking With a Moving Camera an Application of Dynamic Motion Analysis", Proceedings of the Workshop on Visual Motion, Irvine, Calif., Mar. 20–22, 1989.

Additionally, these shaped filters can be spatially oriented such that motion information in certain directions is removed from the difference images. The filtering characteristics can be selected to best select image information that is of concern to the alarm system. For example, the filters can be designed to reject information that is perpendicular to the alarm direction. Thus, motion of objects in an "allowed" direction is removed by the filters as being irrelevant to the alarm process.

It should be noted that this preprocessing stage is ideal for incorporating features such as motion compensation. As such, if the camera that provides the image sequence were a moving camera, the moving image could be preprocessed to remove the camera motion using conventional electronic motion compensation techniques. Consequently, the flow fields would be computed from motion compensated images and, as such, would contain only "real" object motion and not motion resulting from movement of the camera. Such motion compensation include those techniques disclosed in Burt, et al., "Object Tracking With a Moving Camera an Application of Dynamic Motion Analysis", Proceedings of the Workshop on Visual Motion, Irvine, Calif., Mar. 20–22, 1989.

It should also be noted that, although the preferred embodiment of the invention processes three images at a time, the invention encompasses other forms of image preprocessing. For example, two consecutive images could be filtered and then flow fields produced from those filtered images. The step of producing the difference images, although preferred, is not necessary. Furthermore, the preferred embodiment can be expanded to process four images. For example, generate a difference image of the first two image and a difference image of the second two images. The difference images are each then filtered as described above.

The frames that are preprocessed do not have to be consecutive frames as generated by the camera. For example, if the expected motion is slow moving, the apparatus may preprocess every other frame, every third frame, every fourth, etc. On the other hand, if the expected motion is fast moving, then every frame would be processed. An option for the invention is to have the image rate dynamically variable by incorporating a dynamic image selector 228 into the image preprocessor 200. The dynamic image selector selects images at a slow nominal rate, say every fourth image. When any motion, or a certain type of motion, is detected by, for example, the sensitivity adjustment circuit 112, the selector 228 increases the selection rate to, say, every other image frame. If the motion has a extremely large magnitude, the rate could be increased to every frame. The alarm detector 108 of FIG. 1 would typically control the dynamic image selector depending upon the motion meeting some motion criteria.

The flow field processor contains a pair of image shifters 202 and 204, a multiplier 206, an integrator 208, a flow field estimator 210 and a flow field confidence value generator 212. Each image shifter 202 and 204 shifts one of the input images such that operating together the images are shifted relative one another. The shifters are both connected to a multiplier 206 that multiplies the shifted images with one another. The multiplier 206 is connected to the integrator 208. The integrator is connected to both the flow field estimator 210 and the flow field confidence value generator 212. This arrangement of components represents one of the many ways that flow fields can be generated from two images. Any flow field generation apparatus would be useful in the present invention, although that which is depicted in FIG. 2 is considered the preferred embodiment of the invention.

The flow field processor of FIG. 2 is known as a correlation-type processor, wherein the processor repeatedly shifts each input image with respect to the other image and generates a local correlation output image at each shift. In the preferred embodiment, the processor correlates the two difference images. Specifically, the image shifters 202 and 204 shift the difference images with respect to one another. The multiplier multiplies, pixel-by-pixel, the two shifted images and the integrator integrates the multiplied image to form a local correlation output image. The shifters then shift the images again and another local correlation output image is produced. The shifting and correlating process is repeated until a predefined shift pattern is exhausted. The predefined shift pattern is generally defined by the expected flow field. For example, the pattern can be defined only to shift and correlate in a single direction, e.g., only vertical, such that the flow field will only contain motion in that direction. The size of the shift determines the range of motion that is detectable. The larger the shift the larger the motion must be to be detected. Typically, a one pixel shift increment is used, with a shift range of one or more pixels used for correlation searching.

More specifically, the input images are partitioned into local areas containing a predefined number of pixels, e.g., 4–8 pixels. For each image shift, the correlator successively correlates over each local area, one area at a time, and generates a vector for each area representing motion in that particular area. With each shift, the correlator generates an array of correlation values, one for each local region. The flow estimates at each position are based on the set of correlation values at that position for each discrete shift. This method of flow estimation using correlation is described in Hansen, et al., "Real-Time Scene Stabilization and Mosaic Construction", Proceedings of the Second IEEE Workshop on Applications of Computer Vision, Sarasota, Fla., Dec. 5–7, 1994.

In its simplest form, the integrator is a low-pass filter that merely sums up all of the pixel values within a local area for each correlation shift. To improve performance of the integration and reduce computational complexity, it is preferable to integrate using a Gaussian pyramid generator that converts the multiplied image into an image pyramid. For example, an 8×8 pixel local area may be decomposed into a pyramid having three levels: a 4×4 pixel level, a 2×2 pixel level, and a 1 pixel level. The magnitude of the integrated image pixels represents the correlation value for that correlation shift for that image patch. Generating a Gaussian pyramid of the multiplied image, in essence, blurs and subsamples the image. Correlation and integrating in this manner increases signal strength and selection in the local area being correlated. The larger the local area, the greater the noise reduction. However, with a large local area, only large areas of motion can be tracked. If the Gaussian kernel is of sufficient width, subsampling can be performed after Gaussian filtering without loss of information or the introduction of aliasing.

The output from the integrator is one correlation value for each local area and for each image shift. In essence, the output correlation values are a vector for each image patch, one vector component present for each correlation shift used.

The flow field estimator 210 analyzes the local correlation output images and produces a flow field that represents the dominant motion present within that image patch between the two input images.

The output from the integrator is one vector for each local area and for each image shift. In essence, this is a three-dimensional array having seven vectors for each local correlation area of the image. The seven vectors assumes the images have been shifted horizontally, vertically, and diagonally with respect to one another.

The flow field estimator 210 analyzes the local correlation output images and produces a flow field that represents the dominant motion that has occurred between the input images. The flow field estimator determines the maximum correlation for each local area and then uses interpolation about the maximum to determine the motion estimation to a subpixel level. At any local area location where no maxima are present, when there is a very small correlation peak that indicates an ambiguous motion estimation, when there are multiple peaks of similar magnitudes associated with one local area, the flow field estimator will assign a low confidence value for that local area, indicating that flow values at that position are not reliable. When a single correlation peak is found, the flow estimator uses the correlation values to determine the magnitude of the flow vector for that local area, based on the correlation shift that yields the maximum correlation value. To provide a subpixel accuracy, the estimator interpolates about the location of the correlation peak.

In addition to the flow field value, the flow field processor also generates a confidence field. The confidence field generator 212 produces a confidence value for each flow field vector having a magnitude greater than or equal to zero. The confidence value itself represents the sharpness (curvature) and width of the correlation peak, i.e., the shaper and narrower the correlation peak, the greater the confidence that the flow vector is correct. This confidence criteria can be altered to fit the specific application of the apparatus. For example, for flow fields that are expected to be sparse with little noise, the confidence criteria can be very stringent. On the other hand, where the flow field is expected to be dense due to a noisier environment or reduced sensitivity, the confidence criteria may be relaxed.

The confidence field generator may use a normalized correlation rather than the peak sharpness (curvature test), which yields confidence values of 1 for perfect correlation matches and values less than 1 for correlation matches that are not exact. The confidence level can be based on this scale: the closer to the perfect correlation the correlation value is, the larger the confidence value. The highest correlation value for a given local area may not be close to the "perfect" correlation level value. As such, although the value is the highest correlation value, the confidence would be assigned a low value.

The confidence level can also be associated with orientation of the motion within the image. For example, if one of the alternative preprocessing techniques described above are used, the background of the scene will generally contain a number of strongly oriented edges within the scene. It is well known in the art that such edges produce motion vectors that lie parallel to the edges that are unreliable as estimated motion and typically will not represent true motion. The confidence value generator analyzes the motion vector values surrounding each motion vector value. When a given correlation peak lies on a line with other correlation peaks and all the peaks have a similar magnitude, the confidence value generator deems the vector to be on an edge and assigns that vector a low confidence value.

Other forms of optical flow computation can be used in lieu of the integration-type flow field generator described above. Such other motion field generators use a sum of the squared difference (SSD) techniques or sum of the absolute difference (SAD) techniques. In a similar manner to that discussed above, these methods also use a discrete, stepwise approach to computing motion vectors. One continuous shift method uses Taylor series expansion to directly solve for a flow field that minimizes the sum of squared difference about an image position between two images. The particular technique used in motion estimation is a function of the application and the expected degree of motion in that application.

The image segmentor 106 of FIG. 1 analyzes the flow field to determine which vectors meet a specific criteria. For example, the criteria may be that some of the vectors lie in a specific direction, i.e., a count of the vectors pointing in a certain direction that exceed a threshold count, may indicate an alarm situation. In particular, the apparatus may be a portion of a security system that is designed to observe the flow of pedestrians in a single direction, e.g., the entrance to a security checkpoint in an airport. The image segmentor would use a criteria of finding flow field vectors which indicate that a person is moving opposite to the allowed motion direction. When the non-allowed motion is detected, the segmentor marks that motion area as belonging to the region of infraction.

The alarm detector 108 compares the flow field vectors of the highlighted image area to an alarm criteria such that an alarm flag is set if the criteria are met. The criteria could include size of the moving area, speed of the moving area, time or distance over which the moving area has been moving in the incorrect direction and the like. The alarm detector also takes into account the confidence values assigned to the highlighted set of flow field vectors. A highlighted area that meets all the criteria, but has a low confidence level may not be an alarm situation, but a false detection due to noise which can be found most frequently in areas of low feature content.

The optional sensitivity adjustment circuit 112 coupled to the segmentor 106, provides feedback to enable the flow field generator to adapt to the detection environment. Such adaptive behavior is considered an optional feature of the invention. Specifically, the circuit 112 detects (or is informed by the segmentor 106) when the amount of motion being detected is relatively low (when compared to a sensitivity threshold) for the present sensitivity level. In response, the circuit 112 informs the flow field generator 104 that the present sensitivity level is too high. The flow field generator then alters the parameters of the flow field estimator (e.g., pixel block size, motion estimation algorithm, and the like) to refine the flow field estimation. However, making the estimator too sensitive will cause noise to be detected as motion. Similarly, if the alarm detector is overwhelmed with the amount of motion, the sensitivity adjustment circuit can desensitize the flow field estimator parameters.

An alternative to using feedback within the system is to use parameters that simultaneously generate multiple sets of flow fields, e.g., a fast motion set, a medium motion set, a slow motion set. Each set could be sequentially analyzed to identify the motion. For example, the fast motion set is analyzed first, and if no fast motion is detected, the medium motion set is analyzed. Lastly, if still no alarm condition is recognized, the slow motion set can be analyzed. Thus, the adaptive nature is accomplished without using feedback that might result in a missed alarm condition.

Another alternative adaptation feature is to generate a partitioned flow field, i.e., by using fast parameters for areas where fast motion is found and increase the sensitivity for areas where little or no motion is found. Also, as mentioned above, the sensitivity adjustment circuit 112 can be used to dynamically control the image selector 228.

The alarm processor 110 can be any number of responsive measures that are taken after an alarm condition is determined. For example, the alarm processor could activate security locks in a secure area to contain an intruder, alarm indicators could be illuminated, authorities could be notified by telephone or transmitted signal, and so on.

Figure 3:
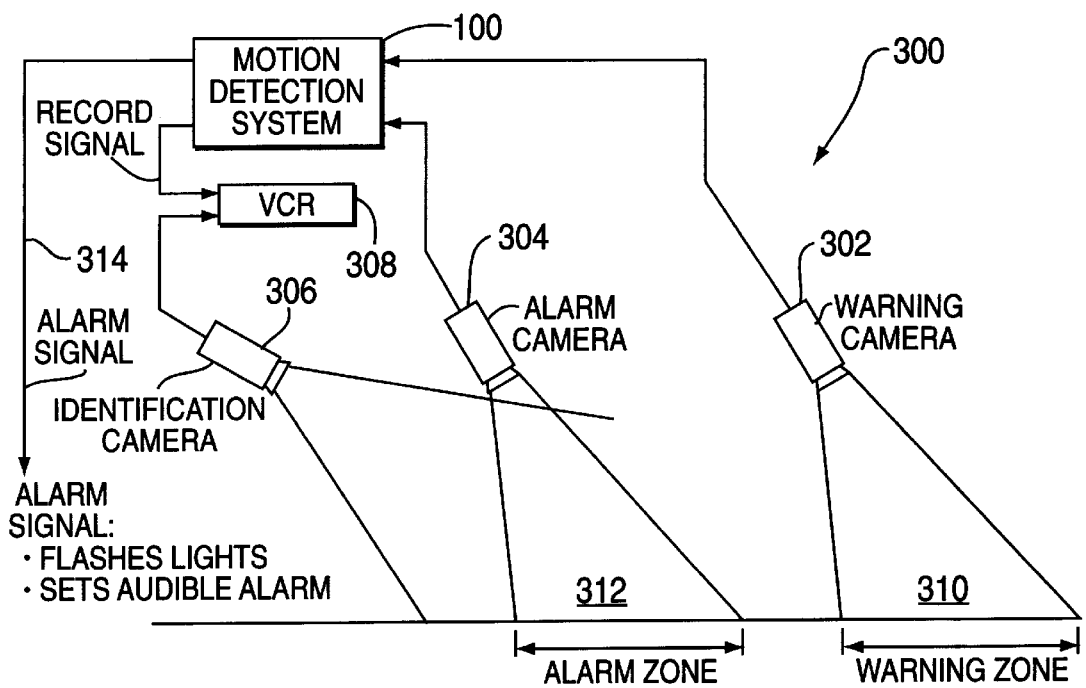
FIG. 3 depicts a block diagram of a specific security application incorporating the invention.

To further describe the invention, two practical systems that embody the invention are described below. Specifically, FIG. 3 depicts a high level block diagram of an airport security system 300. The system contains a warning camera 302, an alarm camera 304, an identification camera 306, a video cassette recorder (VCR) and the motion detection apparatus 100 of the present invention. The cameras are positioned such that an intruder, when entering a secure area, will first pass through a warning zone 310 that is within the field of view of the warning camera. Then, as the intruder proceeds further into the secure area, the intruder enters an alarm zone 312 that is within the field of view of the alarm camera. The identification camera is positioned to ensure that an intruder's face can be recorded on the VCR for future identification.

Specifically, the warning camera 302 produces a sequence of images that is analyzed by the present invention as described above. If the system detects unauthorized motion within the field of view of the warning camera, a warning alarm signal on path 314 is generated that indicates to security personnel that a breach of a secure area may be imminent. This warning may also flash a sign or audible warning to the intruder. If the intruder enters the alarm camera zone 312, the motion detection apparatus 100 activates the VCR 308 such that images from the identification camera are recorded to capture the face of the intruder. The motion detection apparatus 100 then activates an alarm signal warning the security personnel of the breach of the secure area.

Figure 4:
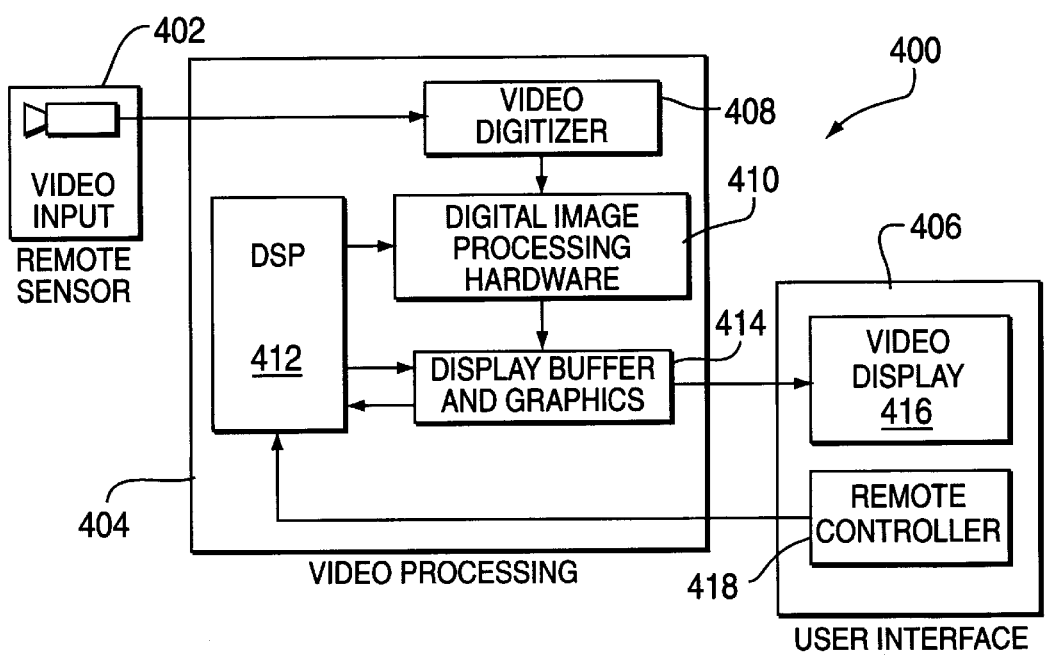
FIG. 4 depicts a block diagram of a generalized security application incorporating the invention.

FIG. 4 depicts a block diagram of a generalized implementation of the present invention within a motion detection system 400. The system contains a remote sensor 402, a video processor 404 and a user interface 406. The remote sensor 402 can be a remote video camera, infrared camera, or other sensor array. The video processor 404 contains: a video digitizer 408 for converting the analog sensor signal into a digital form; digital image processing hardware 410 for performing image filtering, correlation, and other tasks requiring high speed processing; a digital signal processor 412 for controlling the system hardware and performing various algorithm based operations and a display buffer and graphics generator 414 for preparing the images for display to the user. The motion detection apparatus 100 is embodied in the digital image processing hardware 410. The user interface 406 contains a video display 416 for displaying the processed images and a remote controller 418 for controlling the image processing from a remote location.

Although various embodiments which incorporate the teachings of the present invention have been shown and described in detail herein, those skilled in the art can readily devise many other varied embodiments that still incorporate these teachings.

What is claimed is:

1. Apparatus for detecting motion within a scene that is represented by a sequence of images, comprising:

a flow field generator for processing said sequence of images to produce a motion flow field, wherein said flow field generator comprises an image preprocessor for producing filtered images from said sequence of images and a flow field processor for generating said motion flow field from said filtered images, wherein said image preprocessor comprises an image selector for selecting three images from said sequence of images, a first subtractor for subtracting a first image from a second image to create a first difference image, a second subtractor for subtracting said second image from a third image to create a second difference image, a first filter for filtering said first difference image to produce a first filtered image, and a second filter for filtering said second difference image to produce a second filtered image;

a flow field segmentor for extracting said motion flow field from said sequence of images; and an alarm detector for analyzing said motion flow field to determine if said motion flow field meets an alarm criteria.

2. The apparatus of claim 1 wherein said first and second filters are shaped filters.

3. The apparatus of claim 1 wherein said flow field processor further comprises:

a first image shifter for selectively shifting a first filtered image;

second image shifter for selectively shifting a second filtered image;

a multiplier for multiplying said first and second shifted filtered images with one another;

an integrator, connected to said multiplier, for integrating a series of multiplied images;

a flow field estimator, connected to said integrator, for generating said motion flow field from said integrated images.

4. The apparatus of claim 3 wherein said flow field processor further comprises a confidence value generator for producing a confidence value for each flow field vector in said motion flow field.

5. The apparatus of claim 3 further comprising means, connected to said flow field segmentor, for adjusting the sensitivity of the flow field generator in response to analyzing the segmented flow field generated by the flow field segmentor.

6. The apparatus of claim 5 wherein said sensitivity adjusting means controls the image selector.

7. The apparatus of claim 5 wherein said sensitivity adjusting means controls the flow field estimator.

8. A security system comprising:

motion detector comprising:

a flow field generator for processing a sequence of images to produce a motion flow field;

a flow field segmentor, connected to said flow field generator, for extracting said motion flow field from said sequence of images; and an alarm detector, connected to said flow field segmentor, for analyzing said motion flow field to determine if said motion flow field meets an alarm criteria;

a warning camera, connected to said motion detector for imaging a first area of a scene;

an alarm camera, connected to said motion detector, for imaging a second area of a scene; and where said motion detector generates a warning signal when a motion flow field meets certain alarm criteria in said first area of said scene imaged by said warning camera and generates an alarm signal when a motion flow field meets certain alarm criteria in said second area of said scene imaged by said alarm camera.

9. The security system of claim 8 further comprising:

an identification camera for producing images of a third area of a scene; and recording means, connected to said motion detector and to said identification camera, for recording images from said identification camera in response to an alarm signal generated when said images from said alarm camera are processed.

10. The security system of claim 8, wherein said flow field generator comprises an image preprocessor for producing filtered images and a flow field processor for generating said motion flow field from said filtered images.

11. The security system of claim 10 wherein said image preprocessor further comprises:

an image selector for selecting three images from said sequence of images;

a first subtractor for subtracting a first image from a second image to create a first difference image;

a second subtractor for subtracting said second image from a third image to create a second difference image;

a first shaped filter for filtering said first difference image to produce a first filtered image; and a second shaped filter for filtering said second difference image to produce a second filtered image.

12. The security system of claim 11 wherein said flow field processor further comprises:

a first image shifter for selectively shifting a first filtered image;

a second image shifter for selectively shifting a second filtered image;

a multiplier for multiplying said first and second shifted filtered images with one another;

an integrator, connected to said multiplier, for integrating a series of multiplied images;

a flow field estimator, connected to said integrator, for generating said motion flow field from said integrated images.

13. A method for detecting motion within a scene that is represented by a sequence of images, comprising the steps of:

selecting three images from said sequence of images;

subtracting a first image from a second image to create a first difference image;

subtracting said second image from a third image to create a second difference image;

filtering said first difference image to produce a first filtered image; and filtering said second difference image to produce a second filtered image;

generating a motion flow field from said first and second filtered images;

extracting said motion flow field from said sequence of images; and analyzing said motion flow field to determine if said motion flow field meets an alarm criteria.

14. The method of claim 13 wherein said first filtered image is produced by shaped filtering said first difference image and said second filtered image is produced by shaped filtering said second difference image.

15. The method of claim 13 wherein said processing step further comprises the steps of:

selectively shifting a first filtered image;

selectively shifting a second filtered image;

multiplying said first and second shifted filtered images with one another;

integrating a series of multiplied images;

generating said motion flow field from said integrated images.

16. The method of claim 13 wherein said extracting step further comprises the step of producing a confidence value for each flow field vector in said motion flow field.

17. The method of claim 13 further comprising the step of adjusting the sensitivity used to generate said flow field in response to analyzing the extracted flow field.

* * * * *